Feb. 9, 1932.   M. SHOELD   1,844,694
GAS PURIFICATION
Filed Jan. 24, 1931
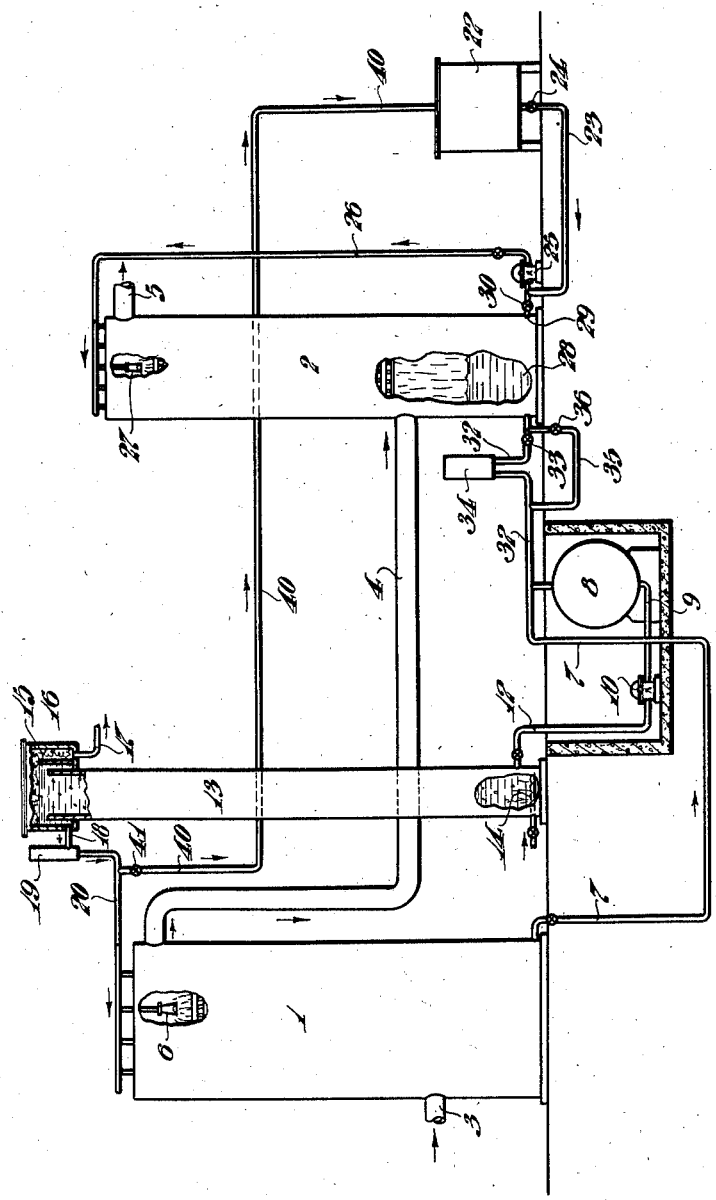
INVENTOR.
Mark Shoeld.
BY
Jesse R. Langley
ATTORNEY.

Patented Feb. 9, 1932

1,844,694

UNITED STATES PATENT OFFICE

MARK SHOELD, OF MOUNT LEBANON TOWNSHIP, ALLEGHENY COUNTY, PENNSYL-
VANIA, ASSIGNOR TO THE KOPPERS COMPANY, A CORPORATION OF DELAWARE

GAS PURIFICATION

Application filed January 24, 1931. Serial No. 510,899.

My invention relates to the purification of gas and more particularly to the removal of hydrogen sulphide and analogous impurities from fuel gas such as coke-oven gas, water gas and other gases containing such impurities.

My invention has an especial relation to gas-purification processes of the character set forth and described in United States Letters Patent Nos. 1,719,180 to Jacobson, 1,719,762 to Gollmar, 1,719,177 to Gollmar and in the copending application for United States Letters Patent, Serial No. 173,613, filed March 7, 1927, of Gollmar.

An object of my invention is to provide an improved method of operating a gas-purification process of the character set forth in the above patents and patent application.

A second object of my invention is to provide a process of gas purification in which substantially complete removal of hydrogen sulphide from the gas treated is made possible.

My invention has for further objects such other operative advantages or results as may hereinafter be found to obtain.

The aforesaid Jacobson patent discloses the use for gas purification of a solution of an alkali-metal compound of a metal the sulphide of which is soluble in alkali-metal sulphide solution, for example, a solution of sodium arsenite. In Patent No. 1,719,762, Gollmar further shows that sodium arsenite, while capable of absorbing $H_2S$, is not regenerable as such by aeration, but, upon sulphidation and aeration, is converted into a thio-arsenic compound, for example, into a sodium thio-arsenate, which, upon further sulphidation, is regenerable as such by aeration and with liberation of elemental sulphur.

It was shown by Gollmar that a sodium arsenite solution, which may be prepared by dissolving arsenous oxide in a solution of sodium carbonate, was capable of absorbing a large quantity of hydrogen sulphide, but that subsequent aeration, while it partially renewed the capacity of the solution for further absorption of hydrogen sulphide, did not cause the evolution of either elemental sulphur or hydrogen sulphide from the solution.

As noted above, Gollmar found the aerated solution previously employed for hydrogen sulphide absorption to be capable of absorbing further hydrogen sulphide and he also found that the thereby sulphided solution, upon further aeration, gave up the sulphur absorbed in this further absorption of hydrogen sulphide, in elemental form. This latter sequence of sulphidation and aeration, that is, subsequent to the initial sulphidation and initial aeration, could be repeated indefinitely so long as the essential ingredients of the solution were maintained against losses due to side reactions, mechanical losses and the like.

For convenience, the initial sulphidation and aeration of the sodium arsenite and its sulphided product, respectively, may be called the initial phase of operation of the process, while the subsequent sulphidations and aerations may be called the secondary, final or stable phase. The transition point between the two phases may be indicated by the appearance of sulphur in the actification stage, but it may be observed that when the process is continuous and aeration is employed from the beginning, the transition may be gradual. The same may be true where arsenic oxide is employed instead of arsenous oxide in preparing the solution.

While the chemistry of the process is difficult and complex, it appears probable that the initial sulphidation of the sodium arsenite results in the formation of a sodium thio-arsenite and that the initial aeration of this material merely causes an oxidation or chemical change of some sort, but does not cause the loss of sulphur from the molecule and, in fact, makes possible the subsequent absorption of more sulphur. Undoubtedly, a sodium thio-arsenate such, for example, as $Na_2HAsS_3O$ is formed by the initial aeration. The subsequent sulphidations and aerations of the final phase apparently do not effect a liberation of the sulphur absorbed in the initial phase but merely result in the alternate absorption of further sulphur and replacement of the same with oxygen from the air with liberation of this further sulphur in elemental form.

It is apparent, therefore, that the initial and final phases of operation are distinguished by an apparently irreversible absorption of hydrogen sulphide in the former case and a reversible absorption of hydrogen sulphide in the latter case. The reaction of the initial phase is, so to speak, a "one-way" reaction, while that of the final phase is a reversible equilibrium reaction.

It is well known that the last traces of hydrogen sulphide in the gas are very difficult to remove where the purification reaction is of the latter type, but that the removal of the last traces of hydrogen sulphide may readily be accomplished where the reaction is of the former or "one-way" type.

In any event, but probably for this reason, the sodium-arsenite solution, as initially employed, is able to absorb a very much larger quantity of hydrogen sulphide in the initial phase than is the sodium thio-arsenate compound which represents the regenerable active material present in the subsequent phase of operation of the process, and my invention is based upon this fact.

As is described in the aforesaid patents, the absorbent and regenerable properties of solutions of the character described are put to use by recirculating a solution containing for example, sodium carbonate and arsenous oxide, through a cycle comprising an absorption stage in which the solution is brought into contact with the gas and an aeration stage, in which the solution is treated with air for actification or regeneration. The apparatus in the latter stage is generally known as a thionizer and may comprise one of a number of types of aerating devices.

It has been observed that, during the starting up of a process of the character noted above, that is to say, during such time as the initial sulphidation and aeration are in progress, or during the initial phase of operation, the absorption of hydrogen sulphide from the gas treated is substantially complete. This is due to the fact, as above stated, that the sodium-arsenite originally present is capable of absorbing much greater quantities of hydrogen sulphide per unit than is the active compound present during the later phase of operation.

After a time, however, the capacity of the solution for absorbing hydrogen sulphide commences to fall, especially where aeration is not employed in this initial phase of operation, indicating that the initial sulphidation of the sodium arsenite is nearing completion. The process then enters the secondary, final or stable phase of operation, during which aeration must be carried on to an extent sufficient to liberate an amount of sulphur equal to that removed from the gas in the form of hydrogen sulphide, and which removal, during the final phase of operation, usually amounts to from 85% to 95% of the total hydrogen sulphide present in the gas treated, when the gas treated contains hydrogen sulphide in amount equal or near to the amount normally contained by coke-oven gas, for example, 350 grains $H_2S$ per 100 cu. ft. of the gas.

It has further been noted, in support of the observations noted, that when starting up a process of this character, liberation of sulphur in the thionizer or actification stage does not commence immediately, but only commences about the time the capacity of the solution for absorption of hydrogen sulphide tends to fall, that is, at the close of the initial phase.

This is not to be taken as indicating that the capacity of the solution in the final phase for hydrogen sulphide absorption is low, as, in fact, removal of from 90% to 95% of the hydrogen sulphide present is obtained in practice in purification processes of this type even during the final phase of the process. Nevertheless, during the initial phase of the process and prior to the time when liberation of sulphur commences, it has been observed that practically 100% of the hydrogen sulphide contained in the gas treated is absorbed.

Moreover, this is not to be taken as indicating that a solution of this character, even in the secondary or stable phase of operation, is incapable of being employed for substantially complete removal of the hydrogen sulphide present in the gas treated, as this is largely a matter of the rate of solution flow, the degree of actification and the like. However, it has been definitely established that it is uneconomical to attempt a higher degree of purification during all but the initial phase of a process of this character, under prior methods of operation.

It has therefore been customary, where purification of the remaining hydrogen sulphide is desired or where the hydrogen sulphide in the gas treated varies to such extent that it may occasionally contain such variable amounts of hydrogen sulphide that the solution may temporarily be unable to accomplish the desired degree of purification, to employ so-called "catch boxes" or "dry purifiers" containing moist iron oxide or the like, to clean up the last traces of hydrogen sulphide in the gas.

During the operation of all liquid purification processes, it is necessary to add to the solution from time to time additional quantities of the active material or materials whose presence is desired. Certain side reactions, such as those resulting in the formation of inert materials such as sodium thiosulphate and sodium thiocyanate, consume sodium or the other alkaline material present. It is necessary to replace the sodium used up in such side reactions by adding sodium carbonate from time to time, as, if this were not done, the active sodium thio-arsenate compound might be depleted of its sodium content to such extent as to impair its efficiency or destroy it altogether. Mechanical losses also occur, which result in the necessity of adding further quantities of both sodium carbonate and arsenous oxide from time to time.

In the past, these additions have been made by simply adding the sodium carbonate and arsenous oxide or a solution thereof to the gas purification solution recirculating through the absorption and actification stage. However, by reason of the fact that these additions are relatively small, as compared with the volume of recirculating solution, their effect has been negligible, so far as making the absorption of hydrogen sulphide complete is concerned.

According to my invention, I contemplate making the additions of fresh sodium carbonate and arsenous oxide or of sodium arsenite to the solution in such manner as to utilize the strongly absorbent properties of a solution of this character to effect a further purification of the gas after the latter has passed through the usual purification stage. In this manner, without requiring the use of additional quantities of replacement material above what is required for the normal operation of the liquid purification process, I make it possible to effect an increased efficiency of purification without resorting to other expedients, such as iron oxide "catch boxes" or the like.

Preferably I accomplish this end by passing the gas through a plurality of absorbers, into the last of which is continuously or intermittently introduced a solution of sodium arsenite or the like. In the remaining absorber or absorbers, located at an earlier point or points along the flow of the gas, the gas is subjected to the action of an absorbent solution originally also containing sodium arsenite, and recirculated through the absorber or absorbers and appropriate actification apparatus. The sulphided solution from the last absorber is delivered to the primary recirculating system, where it replenishes the same and is preferably added at a point in the cycle between the absorber and actification apparatus or thionizer so that, before again coming into contact with the gas, it is subjected to aeration.

In order that my invention may be fully set forth and understood, I now describe, with reference to the accompanying drawing, the preferred manner in which it is practiced and embodied. In this drawing, the single figure is a partially diagrammatic elevational view of apparatus for purifying gas in accordance with the present invention, parts being broken away.

Referring to this drawing, the gas is purified in a pair of absorbers 1 and 2 and which may be designated as the primary absorber and the secondary absorber, respectively. The gas enters the primary absorber 1 through an inlet 3 and, after emerging from the primary absorber 1, passes through a conduit 4 to the secondary absorber 2, from which it finally emerges through an outlet 5. The absorbers 1 and 2 may be of any suitable type but preferably comprise towers filled with gas-and-liquid contact material or "packing", such as wooden hurdles, or the like, and are preferably so designed that the gas and liquid pass through the same in countercurrent with respect to each other.

The solution employed for the purification of the gas in the primary absorber 1 is introduced to the same through a plurality of sprays 6 and, after contact with the gas and the absorption of the bulk of the hydrogen sulphide therefrom, the sulphided solution is withdrawn from the primary absorber 1 through a conduit 7 and passes to a circulating tank 8. From the circulating tank 8, the solution is delivered through a conduit 9, a pump 10 and a conduit 12 to a thionizer 13.

In the present instance, the thionizer 13 is shown as comprising a tall vessel adapted to contain a tall column of the liquid and having an inlet 14 for admission of compressed air at the bottom of said column. The liquid passes upward through the thionizer 13, together with the air introduced to the inlet 14, and is actified or regenerated by contact with the air.

Upon reaching the top of the thionizer 13, the elemental sulphur liberated during the actification or regeneration comes to the surface of the liquid and, after overflowing a weir 15 into a chamber 16, is withdrawn through a conduit 17. This sulphur is usually drawn off in the form of a slurry containing considerable quantities of the solution and while, upon filtration, the greater portion of the solution may be recovered from the sulphur, nevertheless it is practically impossible to recover all of the solution or constituents thereof from the sulphur, thus constituting a source of loss of the active ingredients of the solution.

The regenerated solution then passes through a conduit 18 into a thionizer level regulator 19 and thence through a conduit 20 to the sprays 6, completing its cycle.

According to the present invention, as set forth hereinabove, I effect a further purification of the gas leaving the primary absorber 1 by subjecting the gas to contact with a solution of sodium arsenite. This contact is accomplished in the secondary absorber 2. A solution of sodium arsenite or the like is prepared in a solution tank 22, and this solution is withdrawn through a conduit 23 having a valve 24 and delivered by a pump 25 through a conduit 26 and sprays 27 to the top of the secondary absorber 2.

The secondary absorber 2 is preferably provided, as shown, with a sump 28 in the lower portion thereof which provides storage capacity for a considerable amount of the wholly or partially sulphided sodium arsenite solution after contact with the gas in the upper portion of the secondary absorber 2. The sump 28 communicates through a conduit 29 having a valve 30 with the pump 25 and through a conduit 32 having a valve 33 and a constant-level regulating device 34 with the circulating tank 8 of the primary system. The conduit 32 is also provided with a branch line 35 having a valve 36 for by-passing the device 34 when so desired.

In operating a gas purification process in accordance with the present invention, a suitable quantity of absorbent solution is prepared in the circulating tank 8, preferably by dissolving arsenous oxide and sodium carbonate in water, enough of this solution being prepared to fill the thionizer 13 and the remaining portions of the system and to provide a sufficient reserve capacity to insure against mechanical loss, variations in conditions and the like. During the initial stages of recirculation, as hereinabove set forth, the capacity of this solution for absorbing hydrogen sulphide is extremely high and it is, therefore, unnecessary to operate the secondary absorber until the solution in the primary system begins to lose its capacity for absorbing hydrogen sulphide. At this time or earlier, compressed air is delivered as required to the thionizer and the primary purification operation is stabilized to give, for example, 95% purification of the gas flowing through the primary absorber 1.

Fresh sodium arsenite solution is then delivered from the solution tank 22 to the secondary absorber 2. It may be employed in the secondary absorber 2 with or without circulation, as desired, but, in any event, does not require aeration.

Ordinarily the solution overflows from the sump 28 through the constant-level regulating device 34 and conduit 32 into the tank 8 of the primary system at a rate equal to the rate of addition of solution from the tank 22 to the secondary system. However, when larger amounts are temporarily required, they may be delivered to the tank 8 by opening the valve 36 in the conduit 35.

The amount of sodium carbonate and arsenous oxide required for replenishment of the solution in the primary system will, of course, depend upon the actual amount of hydrogen sulphide in the gas purified, the amount of other impurities, such as hydrogen cyanide, also present, and the extent of mechanical losses, but, in a typical instance, the purification of a typical coke-oven gas containing approximately 350 grains of hydrogen sulphide per 10 cubic feet requires replacement of approximately 0.0125 pounds of $As_2O_3$ and 0.1125 pounds of $Na_2CO_3$ per thousand cubic feet of gas purified. Accordingly, I prepare a solution containing arsenous oxide and sodium carbonate in similar proportion in the solution tank 22 and deliver it to the secondary absorber at a corresponding rate. It is, in turn, ordinarily delivered from the secondary absorber to the primary absorber at a similar rate as described hereinabove.

The strength of the solution employed in the secondary system will depend, to a considerable extent, upon conditions in the primary system. In general, the temperature of the solution recirculating through the primary system is maintained at from 90 to 95° F., which is usually somewhat higher than the temperature of the gas. By reason of this fact and particularly if the gas is dry, considerable quantities of water may be evaporated from the solution in the primary system.

Moreover, mechanical losses remove considerable amounts of solution and it is occasionally desirable to remove solution from the primary system in order to limit the content of the solution with respect to products of side reactions, such as sodium thiosulphate and sodium thiocyanate and to prevent these from building up in the solution to a point where crystallization would occur or efficiency would be reduced.

It is, therefore, desirable to employ a sufficient quantity of water in making up the solution for the secondary system so that this water will automatically balance the losses of water from the primary system. In some cases, it may appear to be difficult to do this without reducing the amount of solution employed in the secondary system to such a point that it would be difficult to maintain proper gas-and-liquid contact conditions in the secondary absorber 2, but this difficulty may be overcome by maintaining an excess quantity of the relatively freshly prepared solution in the bottom of the secondary absorber and recirculating the solution over the secondary absorber at a relatively high rate.

Where this is not desired, it may be advantageous to introduce the solution to the secondary absorber 2 intermittently, as, in this manner, the rate of flow during the periods of admission may be made high enough to insure good distribution and good contact, whereas the same amount of liquid, if continuously delivered, might be insufficient to give the best operating conditions.

It may be desirable, in some instances, to withdraw solution from the primary system for use either alone or with additional quantities of water in making up the solution employed in the secondary system and for this purpose I provide a conduit 40 having a valve 41 leading from a suitable point in the primary system to the solution tank 22.

As an alternative method of starting up a plant employing the process of my invention, the primary system (including the absorber 1, the circulating tank 8 and the thionizer 13) may be left empty at first. The solution in this instance is prepared in the tank 22 and is pumped over the absorber 2, preferably, but not necessarily, at a rate sufficient to substantially completely sulphide the same.

The wholly or partially sulphided solution, after passing through the absorber 2, then passes into the tank 8 and the pump 10 is started, thus inaugurating recirculation of the sulphided solution through the primary system and gradually filling the same to the desired extent. In this instance I prefer to commence aeration in the thionizer 13 as soon as it contains a considerable quantity of the solution, in order that the solution entering the absorber 1 will have the capacity of absorbing hydrogen sulphide from the gas passing through said absorber 1.

By reason of the fact, as above pointed out, that a sodium arsenite solution has a relatively high capacity for hydrogen sulphide absorption, it is possible, when operating in accordance with the present invention, to secure substantially complete removal of hydrogen sulphide from the gas being purified without attempting to operate the primary system in an uneconomical fashion and in spite of variations which might otherwise cause the purified gas to contain from time to time higher quantities of hydrogen sulphide than is desired.

It may be pointed out that when the solution employed in the secondary absorber 2 is recirculated, the solution coming into contact with the gas will actually contain some sulphur, but this does not necessarily interfere with the capacity of the solution to absorb the remaining amount of hydrogen sulphide in the gas. That is, when recirculating a solution containing both sodium arsenite and sodium thio-arsenite, the presence of the latter does not interfere with the effectiveness of the former for absorbing hydrogen sulphide from the gas. It is desirable, however, to have present in the solution some unsulphided sodium arsenite or the like.

While I have hereinabove described my invention with reference to a preferred example, it will be obvious to those skilled in the art that my invention is capable of considerable variation in detail.

As examples of such variation, other compounds of sodium and arsenic, such for example as sodium bicarbonate and arsenic oxide, may be employed in preparing the solution. Moreover, alkali-forming substances other than sodium may be employed as equivalent thereto, for example, calcium, potassium and ammonia, and compounds of other metals whose sulphides are soluble in alkali-sulphide solution. For example, other members of the tin group of qualitative analysis such as tin and antimony may also be employed as equivalent to arsenic.

The quantities and rates of flow will vary with conditions. Various other factors, for example, the alkalinity of the solution, may be varied according to the will of the operator, without departing from the present invention, as will be apparent to those skilled in the art.

My invention is, therefore, not limited to such illustrative example or examples as have been given hereinabove, but is to be construed as of the scope of the claims hereinafter made.

I claim as my invention:

1. The process of purifying a gas from hydrogen sulphide which comprises passing the flowing gas through a plurality of gas-and-liquid contact stages located in series in the path of the gas, treating the gas with a solution of a compound of an alkali-metal and a metal of the tin group of qualitative analysis in the last of said stages, and treating the gas in an earlier stage with at least partially sulphided solution from said last stage.

2. The process of purifying a gas from hydrogen sulphide which comprises passing the flowing gas through a plurality of gas-and-liquid contact stages located in series in the path of the gas, treating the gas with a solution of a compound of an alkali-metal and a metal of the tin group of qualitative analysis in the last of said stages, and treating the gas in an earlier stage with sulphided solution from said last stage, said sulphided solution being recirculated through a cycle comprising said earlier stage and an actification stage.

3. The process of purifying a gas from hydrogen sulphide which comprises passing the flowing gas through a plurality of gas-and-liquid contact stages located in series in the path of the gas, treating the gas with a solution of sodium arsenite in the last of said stages, and treating the gas in an earlier stage with sulphided solution from said last stage.

4. The process of purifying a gas from hydrogen sulphide which comprises passing the flowing gas through a plurality of gas-and-liquid contact stages located in series in the path of the gas, treating the gas with a solution of sodium carbonate and arsenous oxide in the last of said stages, and treating the gas in an earlier stage with sulphided solution from said last stage.

5. The process of purifying a gas from hydrogen sulphide which comprises passing the flowing gas through a plurality of gas-and-liquid contact stages located in series in the path of the gas, treating the gas with a solution of sodium carbonate and arsenic oxide in the last of said stages, and treating the gas in an earlier stage with sulphided solution from said last stage.

6. The process of purifying a gas from hydrogen sulphide which comprises recirculating a solution of a compound of an alkali-forming metal, a metal of the tin group of qualitative analysis and sulphur through a cycle comprising an absorption stage where the solution is brought into contact with the flowing gas for partial purification of said gas and an actification stage, and then subjecting the gas to contact with a solution containing an unsulphided compound of an alkali-forming metal and a metal of the tin group of qualitative analysis.

7. The process of purifying a gas from hydrogen sulphide which comprises recirculating a solution of a compound of an alkali-forming metal, a metal of the tin group of qualitative analysis and sulphur through a cycle comprising an absorption stage where the solution is brought into contact with the flowing gas for partial purification of said gas and an actification stage, and then subjecting the gas to contact with a solution containing an unsulphided compound of an alkali-forming metal and a metal of the tin group of qualitative analysis and adding sulphided solution thereby obtained to said recirculated solution to replenish the same.

8. The process of purifying a gas from hydrogen sulphide which comprises recirculating a solution of a compound of an alkali-forming metal, a metal of the tin group of qualitative analysis and sulphur through a cycle comprising an absorption stage where the solution is brought into contact with the flowing gas for partial purification of said gas and an actification stage, and then subjecting the gas to contact with a solution containing an unsulphided compound of an alkali-forming metal and a metal of the tin group of qualitative analysis and adding sulphided solution thereby obtained to said recirculated solution to replenish the same after said recirculated solution leaves said absorption stage and prior to its entry into said actification stage.

9. The process of purifying a gas from hydrogen sulphide which comprises recirculating a solution of a thio-compound of sodium and arsenic through a cycle comprising an absorption stage where the solution is brought into contact with the flowing gas for partial purification of said gas and an actification stage, and then subjecting the gas to contact with a solution containing sodium arsenite.

10. The process of purifying a gas from hydrogen sulphide which comprises recirculating a solution of a thio-compound of sodium and arsenic through a cycle comprising an absorption stage where the solution is brought into contact with the flowing gas for partial purification of said gas and an actification stage, and then subjecting the gas to contact with a solution containing sodium arsenite and adding sulphided solution thereby obtained to said recirculated solution to replenish the same.

11. The process of purifying a gas from hydrogen sulphide which comprises recirculating a solution of a thio-compound of sodium and arsenic through a cycle comprising an absorption stage where the solution is brought into contact with the flowing gas for partial purification of said gas and an actification stage, and then subjecting the gas to contact with a solution containing sodium arsenite and adding sulphided solution thereby obtained to said recirculated solution to replenish the same after said recirculated solution leaves said absorption stage and prior to its entry into said actification stage.

In testimony whereof, I have hereunto subscribed my name this 21st day of January, 1931.

MARK SHOELD.

CERTIFICATE OF CORRECTION.

Patent No. 1,844,694.  Granted February 9, 1932, to

MARK SHOELD.

It is hereby certified that error appears in the printed specification of the above numbered patent requiring correction as follows: Page 4, line 74, for the numeral "10" read 100; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.